US006558825B1

(12) United States Patent
Faris et al.

(10) Patent No.: US 6,558,825 B1
(45) Date of Patent: May 6, 2003

(54) FUEL CONTAINMENT AND RECYCLING SYSTEM

(75) Inventors: Sadeg M. Faris, Pleasantville, NY (US); Tsepin Tsai, Peekskill, NY (US); Wayne Yao, Bergenfield, NJ (US); Yuen-Ming Chang, Elmsford, NJ (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/570,798

(22) Filed: May 12, 2000

(51) Int. Cl.$^7$ .......................... H01M 8/06; H01M 8/18; H01M 4/00; H01M 2/00; H01M 2/02

(52) U.S. Cl. .............. 429/17; 429/19; 429/27; 429/34

(58) Field of Search .............. 429/17, 19, 27, 429/34

(56) References Cited

U.S. PATENT DOCUMENTS

| | | |
|---|---|---|
| 3,252,838 A | 5/1966 | Huber et al. |
| 3,260,620 A | 7/1966 | Gruber |

(List continued on next page.)

FOREIGN PATENT DOCUMENTS

| | | | |
|---|---|---|---|
| EP | 1081780 | 3/2001 | |
| GB | 1176488 | 1/1970 | .......... H01M/29/02 |
| WO | WO 9816402 | 4/1998 | |
| WO | WO98/16962 | * 4/1998 | ............. H02J/7/00 |
| WO | WO 9818172 | 4/1998 | |

OTHER PUBLICATIONS

Convert 3V To 5V Without Inductors by, Maxim Integrated Products; http://www.maxim-ic.com, vol. 92, 2000, p. 1–3.
Derive 5V From Four AA Cells by, Maxim Integrated Products; http://www.maxim-ic.com, vol. 128, 2000, p. 1–2.
Boost/Linear Regulator Derives 5B From Four Cells by, Maxim Integrated Products, http://www.maxim-ic.com, 2000.
Fuel Cell Technology & Applications, http://www.metallicpower.com/rtfuel.htm by, Metallic Power, Inc., 1999.
Fuel Cells And Their Applications by Karl Kordesch and Gunter Simader, VCH Publishers, Inc., New York Ny, Chapters 4.8.1–4.8.2, 1996, p. 158–162.
Fabrication of Thin–Film LIMN204 Cathodes for Rechargeable Microbateries by F.K. Shokoohi, et. al., Applied Physics Letters, 1991, p. 1260–1262.
New Age EVs by Herb Schuldner, Popular Mechanics, 1991, p. 27–29.
Battery Chargers by Mike Allen, Popular Mechanics, 1991, p. 30–31.
Marketing Study for AER Energy Resources, Inc. by Authors not indicated, AER Energy Resources, Inc., 1991, p. 6–28.

(List continued on next page.)

Primary Examiner—Patrick Ryan
Assistant Examiner—Julian Mercado
(74) Attorney, Agent, or Firm—Gary H. Monka; Ralph J. Crispino

(57) ABSTRACT

An energy conversion system, comprising: a reservoir container including at least two chambers of inversely variable volume for respectively storing a quantity of fuel and receiving a quantity of exhaust; a means for decreasing the volume of the first chamber while concurrently increasing the volume of the second chamber; at least one energy conversion device; first means for communicating fuel between the at least one energy conversion device and a first of the chambers in the reservoir container; and second means for communicating exhaust between the at least one energy conversion device and a second of the chambers in the reservoir container. The reservoir container may be transported to a recharging/refilling station or recharged in-situ. A particular application for metal-air fuel cell power systems is shown and described.

12 Claims, 4 Drawing Sheets

U.S. PATENT DOCUMENTS

| | | |
|---|---|---|
| 3,357,864 A | 12/1967 | Huber |
| 3,414,437 A | 12/1968 | Doundoulaks et al. |
| 3,432,354 A | 3/1969 | Jost |
| 3,436,270 A | 4/1969 | Oswin et al. |
| 3,454,429 A | 7/1969 | Gruber |
| 3,532,548 A | 10/1970 | Stachurski |
| 3,536,535 A | 10/1970 | Lippincott |
| 3,577,281 A | 5/1971 | Pountney et al. |
| 3,663,298 A | 5/1972 | McCoy et al. |
| 3,717,505 A | 2/1973 | Unkle, Jr. et al. |
| 3,822,149 A | 7/1974 | Hale |
| 3,845,835 A | 11/1974 | Petit |
| 3,909,685 A | 9/1975 | Baker et al. |
| 3,928,072 A | 12/1975 | Gerbler et al. |
| 3,963,519 A | 6/1976 | Louie |
| 3,977,901 A | 8/1976 | Buzzelli |
| 4,052,541 A | 10/1977 | von Krusenstierna |
| 4,152,489 A | 5/1979 | Chottiner |
| 4,172,924 A | 10/1979 | Warszawski |
| 4,246,324 A | 1/1981 | de Nora et al. |
| 4,331,742 A | 5/1982 | Lovelace et al. |
| 4,341,847 A | 7/1982 | Sammells |
| 4,551,399 A | 11/1985 | Despic |
| 4,560,626 A | 12/1985 | Joy |
| 4,626,482 A | 12/1986 | Hamlen et al. |
| 4,689,531 A | 8/1987 | Bacon |
| 4,693,946 A | 9/1987 | Niksa et al. |
| 4,714,662 A | 12/1987 | Bennett |
| 4,828,939 A | 5/1989 | Turley et al. |
| 4,913,983 A | 4/1990 | Cheiky |
| 4,916,036 A | 4/1990 | Cheiky |
| 4,950,561 A | 8/1990 | Niksa et al. |
| 4,957,826 A | 9/1990 | Cheiky |
| 4,968,396 A | 11/1990 | Harvey |
| 5,121,044 A | 6/1992 | Goldman |
| 5,185,218 A | 2/1993 | Brokman et al. |
| 5,190,833 A | 3/1993 | Goldstein et al. |
| 5,196,275 A | 3/1993 | Goldman et al. |
| 5,206,096 A * | 4/1993 | Goldstein et al. ............. 429/27 |
| 5,242,765 A | 9/1993 | Naimer et al. |
| 5,250,370 A | 10/1993 | Faris |
| 5,260,144 A | 11/1993 | O'Callaghan |
| 5,306,579 A | 4/1994 | Shepard, Jr. et al. |
| 5,312,701 A | 5/1994 | Khasin et al. |
| 5,318,861 A | 6/1994 | Harats et al. |
| 5,328,777 A | 7/1994 | Bentz |
| 5,328,778 A | 7/1994 | Woodruff |
| 5,354,625 A | 10/1994 | Bentz et al. |
| 5,360,680 A | 11/1994 | Goldman et al. |
| 5,362,577 A | 11/1994 | Pedicini |
| 5,366,822 A | 11/1994 | Korall et al. |
| 5,387,477 A | 2/1995 | Cheiky |
| 5,389,456 A | 2/1995 | Singh et al. |
| 5,405,713 A | 4/1995 | Pecherer et al. |
| 5,411,592 A | 5/1995 | Ovshinsky et al. |
| 5,418,080 A | 5/1995 | Korall et al. |
| 5,432,022 A * | 7/1995 | Cheiky ....................... 429/27 |
| 5,439,758 A | 8/1995 | Stone et al. |
| 5,447,805 A | 9/1995 | Harats et al. |
| 5,462,816 A | 10/1995 | Okamura et al. |
| 5,486,429 A | 1/1996 | Thibault |
| 5,512,384 A | 4/1996 | Celeste et al. |
| 5,525,441 A | 6/1996 | Reddy et al. |
| 5,536,592 A | 7/1996 | Celeste et al. |
| 5,554,452 A | 9/1996 | Delmolino et al. |
| 5,569,551 A | 10/1996 | Pedicini et al. |
| 5,582,931 A | 12/1996 | Kawahami |
| 5,599,637 A | 2/1997 | Pecherer et al. |
| 5,665,481 A | 9/1997 | Shuster et al. |
| 5,691,074 A | 11/1997 | Pedicini |
| 5,711,648 A | 1/1998 | Hammerslag |
| 5,721,064 A | 2/1998 | Pedicini et al. |
| 5,726,551 A | 3/1998 | Miyazaki et al. |
| 5,756,228 A | 5/1998 | Roseanou |
| 5,771,476 A | 6/1998 | Mufford et al. |
| 5,904,999 A | 5/1999 | Kimberg et al. |
| 5,952,117 A * | 9/1999 | Colborn et al. ............... 429/27 |
| 5,978,283 A | 11/1999 | Hsu et al. |
| 6,057,052 A | 5/2000 | Shrim et al. |
| 6,384,569 B1 * | 5/2002 | Pintz et al. .................. 320/101 |

OTHER PUBLICATIONS

Electric Car Showdown in Phoenix by Rick Cook, Popular Science, 1991, p. 64–65,82.

LBL Researchers Work on New Generation of Batteries by Jeffery Kahn, www.lbl.gov/Science–Articles/Archive/battery–development–at–lbl.html, 1990, p. 1–6.

Batteries for Cordless Appliances by Ralph J. Brodd, Ch. 3 of Batteries of Cordless Appliances, 1987, p. 49–59.

* cited by examiner

FUEL CONTAINMENT AND RECYCLING SYSTEM

FIELD OF THE INVENTION

The present invention relates generally to fuel and exhaust containment for energy conversion systems, and more particularly, to fuel containers and recycling systems for metal-air fuel cells.

BACKGROUND OF THE INVENTION

Fuel cells, and in particular metal-air battery systems, have long been considered a desirable power source in view of their inherent high energy density. A fuel-cell battery includes a cathode, an ionic medium and an anode. A metal-air cell employs an anode comprised of metal particles that is fed into the cell and oxidized as the cell discharges. The cathode is generally comprised of a semipermeable membrane, a mesh of inert conductor, and a catalyzed layer for reducing oxygen that diffuses through the membrane from outside the cell. Since oxygen is readily available in the air, it is usually unnecessary to utilize a dedicated oxygen storage vessel for the fuel-cell battery (except in certain configurations where there the oxygen supply is limited due to design considerations). This makes metal-air cells very efficient on both a volumetric energy density and cost basis. The cathode and anode are separated by an insulative medium that is permeable to the electrolyte. A zinc-air refuelable battery consumes zinc particles and oxygen as zinc is oxidized by the reaction with ions passing through the electrolyte while liberating electrons to produce electricity. The reaction products are generally comprised of dissolved zincate and particles of zinc oxide suspended in the spent electrolyte.

Prior art metal-air systems have been demonstrated with sufficient energy capacity to power electric vehicles. Such metal-air batteries having recirculating metal slurry anodes were built for demonstration purposes in the 1970s by Sony, Sanyo, the Bulgarian Academy of Sciences, and the Compagnie General d'Electricitie. These systems never achieved any commercial success because they all had relatively low power output (acceptable drain rates and overall capacities). Until now, this has been the major obstacle to providing a commercially viable system. For example, Sony could only provide 24 W/kg, and Compagnie General d'Electricitie was limited to 82 W/kg or 84 Wh/kg. The theoretical capacity, however, is well in excess of five times these values depending upon the type of fuel utilized. One type of recent metal-air cell has realized an improvement in capacity by utilizing a packed bed of stationary anode particles and an electrolyte which moves through the bed without the use of an external electrolyte pump. Although this system has increased the cell capacity to about 200 W/kg with an energy density of about 150 Wh/kg, further improvements are necessary before commercial success will be realized.

Metal-air refuelable batteries can be refueled in a short amount of time (i.e., minutes), compared to the several hours typically required to recharge conventional batteries. This characteristic makes them very well suited to mobile applications such as electric vehicles, portable power sources and the like. During the refueling operation, fresh anode metal and electrolyte are added to the cell, and the reaction products and spent electrolyte are removed. The reaction products must be either transported to an industrial facility for recycling or used, as is, for another purpose. Several methods have been proposed for refueling metal-air cells. One known system employs two reservoirs, one to store fresh anode fuel and one to accommodate reaction materials from the cell.

U.S. Pat. No. 4,172,924 discloses a metal-air cell that utilizes a fluid metal fuel comprised of a mixture of metal particles and liquid electrolyte in a paste form. The paste moves from a first reservoir through the electrochemical battery where it is oxidized at a corresponding metal oxide paste cathode. The reaction products (primarily metal oxide) are communicated to a second reservoir. While this arrangement increases the drain rate by removing the reaction materials, the multiple reservoir design wastes space, adds complexity, and increases cost.

Recently issued U.S. Pat. No. 5,952,117 discloses a fuel cell battery designed to overcome the disadvantages associated with the dual reservoir configuration described above. The '117 patent discloses a transportable container for supplying anode material and electrolyte to the fuel cell battery, circulating electrolyte in a closed system, and collecting spent anode reaction product. In accordance with the teachings of this patent, the container is first filled with zinc fuel particles and fresh electrolyte. Next, the container is transported to the fuel cell battery and connected to the battery such that it becomes part of the electrolyte flow circuit. After the zinc fuel and electrolyte are used for a period of time during battery discharge, the container, now containing at least partially spent electrolyte and reaction products, is removed from the battery and transported back to the refilling apparatus. The contents of the container are subsequently emptied into the refilling apparatus and the process is repeated. The spent electrolyte and reaction products are regenerated at a zinc regeneration apparatus and then returned to the refilling apparatus. Although this arrangement obviates the need for two separate containers, the collection of reaction products can be made effectively only after the fuel supply has been exhausted and the container has been emptied into the refilling apparatus.

Another shortcoming of this system concerns the structure for preventing stray short circuit currents between a plurality of cells that are fed fuel in parallel. In that configuration, the cells are not electrically isolated from each other through the conductive fuel feed. To prevent short-circuiting, the '117 patent discloses a filter for blocking large particles of anode material from passing through the conduits between the fuel compartments. Although effective for the pellet-type fuel particles disclosed in the patent, this expedient cannot block the passage of the small anode particles that are found in a paste-like fuel substance.

SUMMARY OF THE INVENTION

In view of the above, it is an object of the present invention to provide a convenient, economical and environmentally safe fuel supply and waste material retrieval system for use with an energy conversion device.

It is another object of the present invention to provide a single reservoir container for concurrently supplying fuel to an energy conversion device and collecting exhaust from the energy conversion device.

It a further object of the present invention to provide a single reservoir container for supplying fuel and collecting reaction products, respectively, to and from fuel cells, and in particular, metal-air fuel cells using zinc, aluminum, lithium, magnesium, silver, iron and the like.

It is another object of the present invention to provide a metal-air fuel cell system that can be used for varied applications in terms of power requirements (i.e., in the watt to megawatt range). Such applications include, but are not limited to, providing energy for powering motor vehicles, portable and consumer electronics, homes and industry.

It is yet another object of the present invention to eliminate short-circuiting between a plurality of electrochemical cells having a single fuel feed.

In view of the above objects and additional objects that will become apparent hereinafter, the present invention generally provides a method and system for providing fuel to an energy conversion device from a single reservoir container and concurrently receiving exhaust from the energy conversion device in the container.

In particular, the present invention provides a fuel cell system that includes a reservoir container, which is connectable to the cell to supply fuel and concurrently collect waste or reaction materials that are generated as the cell discharges. The invention is adapted for use with hybrid rechargeable fuel cells, and in particular, metal-air fuel cell batteries having metal anode material in fluid form. The word "fluid" is defined herein as a paste-like substance such as for example small particles of metal suspended in a fluid electrolyte, i.e., a KOH solution and varying additives. Metal-air fuel cells operate as oxygen or air (fuel) oxidizes the metal anode as part of the electrochemical cell reaction.

In the present invention, the fluid anode, particularly zinc-metal fuel, is supplied from a single reservoir to multiple cells in a battery system. During operation, as the cells discharge the resulting reaction products are continuously removed from the cells to the reservoir container and the cells are replenished with fresh anode fuel from the container.

In accordance with a general aspect of the invention, there is provided a reservoir container for storing a quantity of fuel and a quantity of exhaust in an energy conversion system having at least one energy conversion device. The reservoir container comprises a container body connectable to the at least one energy conversion device and includes at least two chambers of inversely variable volume disposed within the container for respectively storing a quantity of fuel and receiving a quantity of exhaust. A structure is provided for decreasing the volume of the first chamber while concurrently increasing the volume of the second chamber. During operation of the energy conversion device, fuel is supplied from the first of the chambers while exhaust is concurrently received in the second of the chambers. When the fuel supply is exhausted, the reservoir container may be removed and transported to another location to enable regeneration of the exhaust into fresh fuel. The reservoir container is subsequently reconnected to the energy conversion device and fresh fuel is fed from what was previously the "exhaust" chamber while exhaust is received in the original fuel supply chamber.

In accordance with a particular implementation of the invention for a fuel cell battery system, a single reservoir container is provided for storing a quantity of electrochemical anode material and a quantity of reaction products. The reservoir container includes at least two isolated chambers of inversely variable volume, and at least one cell element having a cathode and defining a volume for holding the anode material (metal and electrolyte) to form an electrochemical cell with the cathode. A fluid delivery circuit communicates anode material between the at least one cell element and a first of the chambers in the reservoir container. Either the same or an independent fluid delivery circuit communicates reaction products between the cell(s) and a second of the chambers in the reservoir container. In a preferred embodiment, the delivery circuit respectively comprises branch ducts or conduits disposed between the cell(s) and the reservoir container. Each conduit includes an electrically insulating valve to selectively transfer fresh anode material and reaction products to and from a single cell in a group of cells which are electrically interconnected.

In accordance with another aspect of the invention, the fuel cell power system further comprises a subsystem for regenerating the reaction products into fresh electrochemical anode material after the reaction products are removed to the reservoir container from the cell(s); and a structure for varying the respective volumes of the first and second chambers as fresh anode material is delivered to the cell and reaction products are delivered to the reservoir. The subsystem for regenerating the reaction products may be disposed proximal to the cells, or it can be situated at a remote location and the reservoir container transported thereto after all the fuel as been dispensed.

In another embodiment, the first chamber of the reservoir container comprises a first subchamber for holding fresh anode material and a second subchamber for holding electrolyte. These components are delivered to a mixer from the respective first and second subchambers prior to communication to the cell(s). Likewise, the reservoir may be configured with a first subchamber for holding anode reaction material and a second subchamber for holding used electrolyte. These components are separated from each other before they are delivered to the reservoir from the cell(s).

The invention further provides a method for supplying fuel to, and collecting exhaust from, an energy conversion device. The method comprises the steps of:

connecting to the energy conversion device a reservoir container having at least two chambers for respectively supplying a quantity of fuel to and receiving exhaust from the energy conversion device;

inversely varying the volume of the first and second of the chambers in the reservoir to supply fuel to the energy conversion device and receive exhaust from the energy conversion device;

disconnecting said container from said energy conversion device;

converting the exhaust into fuel within the container; and reconnecting said container to the energy conversion device to supply fresh fuel thereto from the second of the chambers and to receive exhaust in the first of the chambers.

In a specific application of the above, the present invention provides a method for supplying fuel to, and collecting reaction products from, at least one fuel cell element, comprising the steps of:

connecting to the fuel cell a reservoir container having at least two chambers for respectively supplying anode fluid to and receiving reaction products from the fuel cell element;

inversely varying the volume of the first and second of the chambers in said reservoir to supply anode fluid to the fuel cell and to receive reaction products from the fuel cell element;

disconnecting said container from the fuel cell;

converting the reaction products in the second of the chambers into fuel; and reconnecting the container to said fuel cell to supply fresh anode fluid thereto from the second of the chambers and to receive reaction products in the first of the chambers.

The present invention will now be described with particular reference to the accompanying drawings.

BRIEF DESCRIPTION OF THE DRAWINGS

FIG. 3A is a schematic of a reservoir having four sub-chambers and a separator element for separating spent fuel into anode metal and electrolyte;

DETAILED DESCRIPTION OF THE PREFERRED EMBODIMENTS

Figure 1:
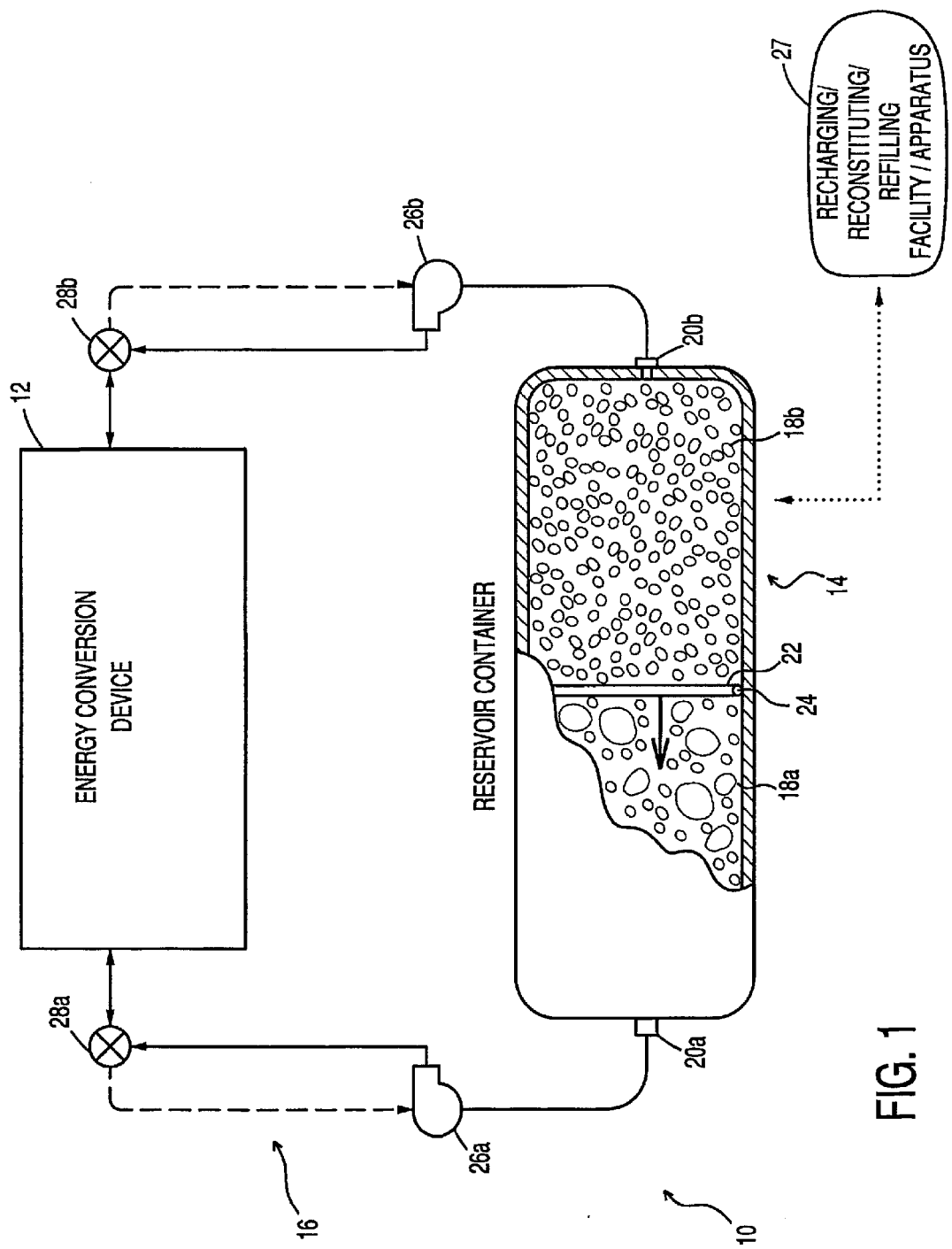
FIG. 1 is a schematic of an energy conversion system and single reservoir container for supplying an energy conversion device and receiving exhaust from the energy conversion device in accordance with the present invention.

The low energy density of typical metal air batteries has prevented their practical use in high rate applications such as, for example, powering motor vehicles. The present invention overcomes the shortcomings in the prior art by using a single reservoir container to dispense the fuel and to collecting and reconstituting the electrochemical reactants (i.e., mostly metal oxide)in a manner similar to secondary battery systems. The hybrid configuration (i.e., refuelable/rechargeable) provides a long discharge life (or high energy density), faster recharging capability leading to enhanced performance during discharge, and a longer cycle life.

The present invention embodies "fuel splitting" wherein multiple metal/air cell voltages are obtained with only one fuel source without short-circuiting the cells. As a result, batteries made with the cell configuration of the present invention can provide at least about 330 Wh/kg/750 Wh/L, making them well suited as a power source for pure or hybrid electric vehicles.

In preferred embodiments of the invention, the air depolarized cathodes are designed to handle a discharging current density of 500 to 2000 mA/cm$^2$ with an electrolyte capable of supporting a capacity of 5000 Ah/L. It is preferred to utilize metal anode material comprising corrosion-resistant additives and alloys. The anode substance is preferably comprised of small metal particles sized so that the metal particles do not become completely oxidized on the anode surface during the electrochemical reaction. The preferred particulate range is selected to be between approximately 10 nanometers and one millimeter, although the smaller sizes provide higher capacity, better drain rate, and facilitate easier fluid transport through the system.

The metal fuel container is shaped to maximize the volumetric capacity, and to increase both capacity and discharge capability. With respect to the shape of the individual cell elements, a cylindrical configuration is preferred for greater power density, although other shapes may be employed within the scope of the invention.

The reservoir container includes a mechanical means for inversely varying the respective volumes of the fresh paste (fuel) storage chamber and the reaction products (exhaust) chamber as fresh metal paste flows from the reservoir container and into the respective cells and the spent metal paste returns from the cells to the reservoir container. The mechanical means may include a movable wall defining the boundary between the chambers such as a piston, screw mechanism and the like. In this manner, the reaction product occupies the space in which the fresh metal paste was previously disposed. The mechanical system can be used to force the paste out of the container or it can operate in conjunction with external pumps in a fluid circuit.

For applications which have relatively smaller power requirements such as consumer electronics, the reservoir can be designed with flexible walls that may be compressed by an external force (such as by a hand) to force feed the fuel into the cells and to return the waste material to the reservoir.

Where a plurality of cells are electrically interconnected, an insulating/splitting system (ISS) may be employed to prevent short-circuiting. The ISS comprises a series of valves communicating with independent fuel feed lines that respectively join each cell. This configuration enables a single fuel reservoir to feed fresh metal paste to a plurality of electrically isolated cells. The system utilizes an "on" and "off" mechanism which selectively enables fresh metal paste is fed into the individual cells as reaction materials are evacuated in the "on" state. During cell operation the ISS is turned off, and metal paste in each cell is electrically isolated from the main fuel pipeline.

In one embodiment, the ISS includes a Teflon (or some other insulating material) stopcock or valve positioned between each of the cells and the main feed pipeline. The stopcock/valve can be moved between left and right to open or close the paste pathway in a conventional manner. In another embodiment, the Teflon stopcock/valve can rotate through 90 degrees to open or close the paste pathway. All of the stopcocks/valves in the system move or rotate intermittently. As a result, the cells in series are filled with fresh metal paste at the same rate, but in a staggered fashion. In this manner, the ISS prevents current leakage or short-circuiting between the cells through the metal fuel feed.

To maximize the volumetric efficiency of the system, each cell preferably has a cylindrical-shape and comprises an air-diffusion cathode, a separator, and a nickel-based current collector. Metal paste is continuously filled into a predefined space between the separator and anode current collector. Examples of conductive polymer gel membrane separator materials where anion- and cation- conducting membranes are formed are disclosed in co-pending U.S. appl. Ser. No. 09/259,068, filed Feb. 26, 1999, which is hereby incorporated by reference. The gel composition of the membrane contains the ionic species within its solution phase such that the species behaves like a liquid electrolyte, while at the same time, the solid gel composition prevents the solution phase from diffusing into the device. Such a membrane comprises, in part, a support material or substrate, which is preferably a woven or nonwoven fabric, such as a polyolefin, polyvinyl alcohol, cellulose, or a polyamide such as nylon. More particularly, the polymer-based gel or film portion of the membrane includes an electrolyte in solution with the polymerization product of a polymerization initiator and one or more water-soluble ethylenically unsaturated amide or acid monomers, preferably methylenebisacrylamide, acrylamide, methacrylic acid, acrylic acid, 1-vinyl-2-pyrrodlidinone, or combinations thereof. Specifically, the separator comprises an ion-conducting polymer-based solid gel membrane comprising a support onto which a polymer-based gel having an ionic species is contained within a solution phase. The polymer-based gel comprises a polymerization product of one or more monomers selected from the group of water soluble ethylenically unsaturated amides and acids, and a reinforcing element selected from the group of water soluble and water swellable polymers, wherein the ionic species is added to one or more of the monomers, and the reinforcing element is added prior to polymerization. Other separator materials that can be used in the present invention are disclosed in co-pending U.S. application Ser. No. 09/482,126, filed Jan. 11, 2000, the disclosure of which is hereby incorporated by reference. The '126 Application discloses a separator comprising a support or substrate and a polymeric gel composition having an ionic species contained in a solution phase thereof. In preparing the separator, the ionic species is added to a monomer solution prior to polymerization and remains embedded in the resulting polymer gel after polymerization. The ionic species behaves like a liquid electrolyte, while at the same time, the polymer-based solid gel membrane provides a smooth impenetrable surface that allows the exchange of ions for both discharging and charging of the cell. Advantageously, the separator reduces dendrite penetration and prevents the diffusion of reaction products such as metal oxide to remaining parts of the cell. Furthermore, the measured ionic conductivity of the separator is much higher than such property of prior art solid electrolytes or electroyte-polymer films.

A suitable cathode structure is described in co-pending U.S. appl. Ser. No. 09/415,449, filed Oct. 8, 1999, the disclosure of which is hereby incorporated by reference. The cathode in the '449 Application comprises a porous metal foam substrate, formed with a network of interconnected pores. An active layer and a hydrophobic microporous gas diffusion layer are both disposed on one or more surfaces of the metal foam substrate. The metal foam substrate serves as the current collector of the cathode. The microporous layer is a plastic material such as a fluoropolymer (i.e., PTFE). The cathode may also include a particulate microstructure reinforced by relatively strong bonding provided by sintering a polymeric binder within the three-dimensional interconnected porosity of the metal foam substrate. The reactive layers are preferably fabricated from the same material as binder. This advantageously enables a single roll pressing operation to simultaneously impregnate the binder into the substrate and form the reactive layers thereon. A method for forming such an electrode may comprise the steps of mixing carbon with a polymeric binder to form a carbon/polymer blend, preparing the carbon/polymer blend as a liquid dispersion or slurry, disposing the carbon/polymer blend within the pores of the substrate in a substantially continuous process, disposing an active layer on the substrate, and sintering the polymeric binder in-situ with the pores of a current collector.

For the anode current collector, an integrated static mixer and current collector is used to efficiently mix the metal paste to constantly expose unreacted metal to the cathode surface while the fuel is travelling through a cell or power stack. This static mixer ensures good contact between the cathode and metal paste anode to optimize discharge capability.

A preferred metal paste exhibits high electrochemical activity, good fluidity, low internal resistance, and anti-corrosion property. A desired paste composition consists of metal powder (or metal particles in the aforementioned size range), fluid gel or paste forming electrolyte (e.g. with about 30–35% KOH solution), anti-corrosion agent, lubricant, and electrical conducting agent and, if desired or necessary, other additives.

A fluid paste consisting of metal granules (which can be obtained from, for example, Aldrich Chemical Co., Milwaukee, Wis.), and 35% gel electrolyte (5% polyacrylamide, 35% KOH, 60% water) exhibits desirable characteristics including low internal resistance and good fluidity.

With reference now to FIG. 1 of the drawings, there is depicted schematic overview of an energy conversion system 10 comprising an energy conversion device 12, reservoir container 14, and fluid circuit generally denoted by the reference numeral 16. The energy conversion device 12 converts fuel into energy and exhaust, and can be any one of a variety of devices, with an illustrative application for a fuel cell(s) described in greater detail hereinbelow. The reservoir container 14 is partitioned into at least two chambers 18a, 18b, for respectively holding varying quantities of fuel and exhaust. In this regard, the chambers 18a, 18b are adapted to vary inversely in volume such that as fuel is first dispensed from chamber 18a, an amount of exhaust is collected in chamber 18b. After the entire quantity of fuel from chamber 18a has been supplied to the energy conversion device 12 and chamber 18b has filled with exhaust, the reservoir container can be disconnected from the fluid circuit 18 by through appropriate fittings designated generally at 20a, 20b. The reservoir container may then be transported to a facility/apparatus generally denoted at 27 for reconstituting the exhaust into fresh fuel using known processing techniques, or for smaller scale applications in the case of a fuel cell battery as described below, directly recharged by an apparatus in situ. The reservoir container 14, now containing a fresh supply of fuel in chamber 18b (with chamber 18a empty), is reconnected to the fluid circuit 16 and the process of fueling the energy conversion device is reversed. Fresh fuel is then dispensed from chamber 18b and the exhaust collected in chamber 18a. The entire process is thereafter repeated.

The reservoir container 14 depicted in FIG. 1 is schematically depicted with a movable wall 22 that defines the boundary between the respective chambers 18a, 18b and which varies the respective volumes of the chambers. The wall 22 may include a separate sealing assembly 24 (i.e., an o-ring assembly) to prevent leakage between the chambers. The wall 22 may be bi-directionally driven via a mechanical mechanism (not shown) operably coupled to a piston, screw-drive, or the like. It is anticipated that many expedients can be utilized, and those of ordinary skill in the art will understand that the particular examples shown herein are not intended to be limiting.

The flow circuit 16 is schematically depicted as including a pair of pumps 26a, 26b communicating with branch ducts, conduits, or pipes shown in solid and dotted lines. A pair of valves 28a, 28b may be independently actuated to selectively enable fluid in the circuit to flow to and from each chamber. The dotted lines indicate pathways for reverse flow depending on the operation of the respective pumps 26a, 26b when the fuel is either dispensed from chamber 18a or chamber 18b, and the exhaust is returned to the opposite chamber 18b or 18a. The flow circuit 16 may further include one or more vents and associated hardware of the type well known in the art of fluid plumbing.

These components are not shown for clarity and are well understood by those skilled in the art.

Figure 2:
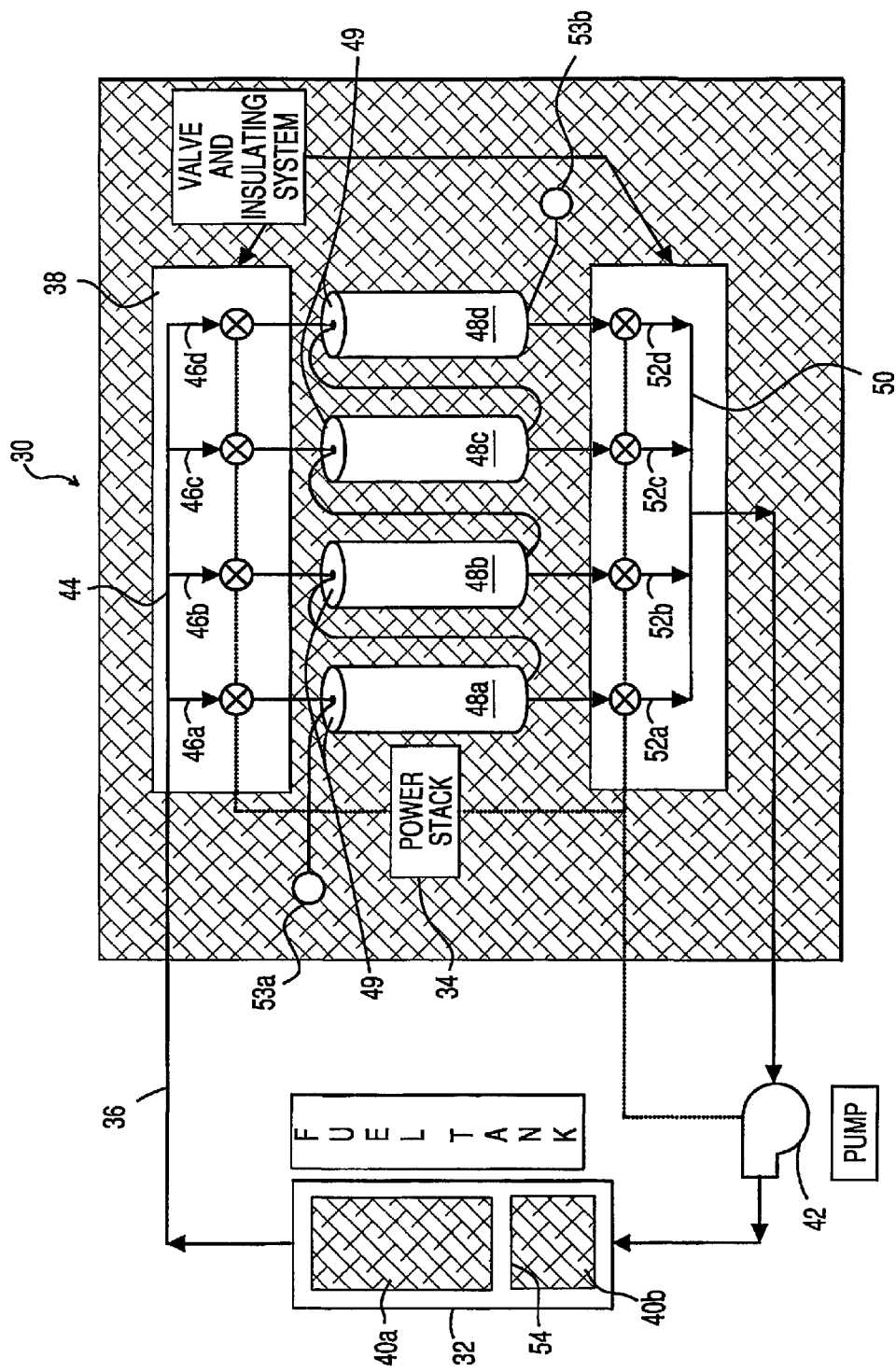
FIG. 2 is a schematic of a representative fuel cell power system in accordance with the present invention.

Referring now to FIG. 2, there is shown a schematic of a representative fuel cell power system 30 in a first embodiment.

The power system 30 generally includes a reservoir container 32, power stack 34, flow circuit 36 and valve/ insulating system (ISS) 38. The reservoir container includes a pair of chambers 40a, 40b of inversely variable volume as described above with respect to the general embodiment illustrated in FIG. 1. As shown in FIG. 2, fluid anode material is initially contained in chamber 40a. The flow circuit 36 contains a pump 42 (a single pump is depicted, but more than one may be installed, with the additional pump(s) located proximal to chamber 40a) to drive the fluid through the system. The fuel is initially dispensed from chamber 40a to the ISS 38. The ISS 38 includes a fuel feed conduit 44 having respective branch lines 46a–d to communicate the anode paste (or reaction products upon reversal of the cycle) from the reservoir container 32 to a plurality of corresponding cell elements 48a–d. Each cell includes an air-cathode assembly 49 of the exemplary type described above. A similar conduit 50 with respective branch lines 52a–d is connected to the reservoir container 32 via the pump 42. The cell elements forming the power stack are electrically interconnected in a conventional fashion and communicate with an external application via terminals 53a, 53b. During operation in an exemplary cycle, fuel is transferred from chamber 40a and reaction products are communicated from cell elements 48a–d to the chamber 40b. By moving a partition 54 in the reservoir container 32 by a specific distance, the storage volume for the reaction products in the reservoir chamber 40b increases while the storage volume for anode fluid in chamber 40a decreases (with a 20% volume compensation to account for the volume change as the fresh fuel is converted to reaction products). After the fuel is depleted, the reservoir container 32 is then transported to a recharging station (shown schematically in FIG. 1) for recharging/reconstituting the reaction products into fresh anode material. Alternatively, the waste products may be recharged in-situ by applying a voltage to the oxidized material in a manner well known in the art. After charging, the reservoir container 32 is reconnected to the system and the cycle is reversed with the fresh anode fuel being dispensed from chamber 40b and the reaction products collected in chamber 40a.

The corresponding valves 46a–d and 52a–d, respectively, operate in pairs to selectively feed fuel and exhaust reaction products to the cells. The inlet and outlet valves for contiguous cells operate independently of each other, such that only a single cell at a time is supplied with fuel and exhausted of reaction products. As a result, there is no electrical continuity between the individual cells via the conductive metal anode material in the supply/removal circuit. This cell design has few moving parts and simple construction with readily available materials. The fuel, which is in the form of a paste comprised of particles of metal and gel electrolyte as described above, can flow freely through the system under pressure from an external pump, in a manner similar to hydrogen fuel in $O_2$—$H_2$ fuel cells. The integration of the fuel supply and waste material storage in a single container partitioned into inversely variable storage volumes for the respective components provides better space utilization, simplifies storage, supply and transportation of the fuel, and ultimately provides consumers with reduced energy costs.

Figure 3:
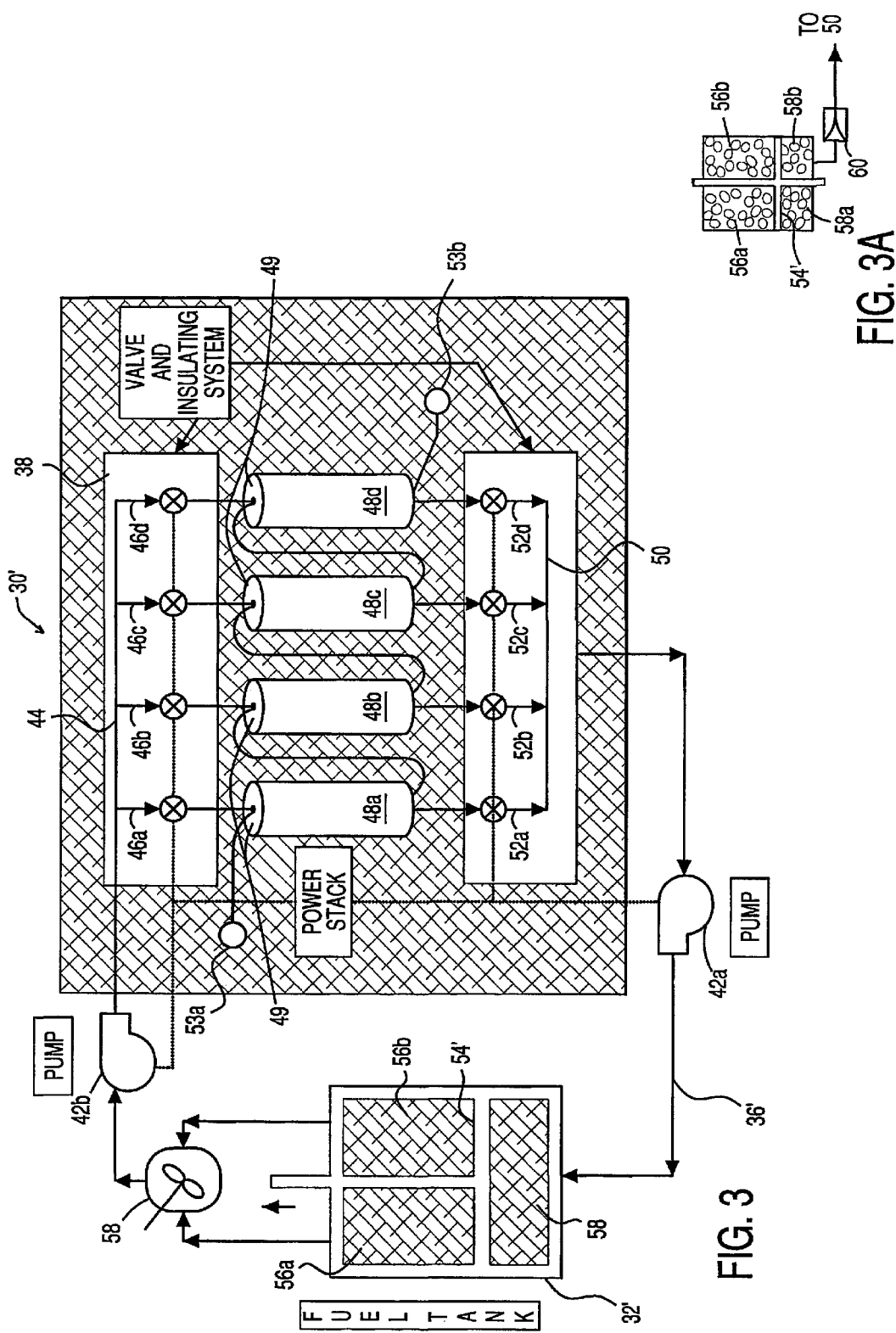
FIG. 3 is a schematic of a modification of the embodiment shown in FIG. 2 adding a dual-chambered mixing section to generate metal paste in situ.

Referring now to FIG. 3, there is depicted another embodiment of a metal-air fuel cell power system 30' with like components from the above embodiment similarly numbered. The fuel cell power system 30' includes a reservoir container 32', power stack 34, flow circuit 36' and valve/insulating system (ISS) 38. The reservoir container has been modified to include a plurality of chambers 56a, 56b and 58. Chambers 56a and 56b are driven together and vary in volume inversely to chamber 58 in accordance with the principles discussed above. The fluid anode metal here is separated from the electrolyte, with the metal initially contained in chamber 56a, and the electrolyte in chamber 56b. The flow circuit 36 contains pumps 42a, to drive the fluid through the system. A mixer 58 communicates with the respective chambers 56a, 56b to mix the fluid metal and electrolyte into "anode paste" prior to cell delivery via pump 42b and fuel feed conduit 44. A plurality of respective branch lines 46a–d communicate anode paste from the reservoir container 32 to a plurality of corresponding cell elements 48a–d. A similar conduit 50 with respective branch lines 52a–d is connected to the reservoir container 32' via the pump 42a. The cell elements forming the power stack are electrically interconnected in a conventional fashion and communicate with an external application via terminals 53a, 53b. During operation anode metal and electrolyte are transferred from chambers 56a, 56b, respectively, combined in the mixer 58, and delivered to the cells 48a–d. As the cells discharge, the reaction products are communicated to chamber 50. By moving a partition 54 in the reservoir container 32' by a specific distance, the storage volume for the reaction products in the reservoir chamber 58 increases while the storage volumes for fuel components in chambers 56a, 56b decrease (with a 20% volume compensation). The reaction products fill the full volume of the reservoir container 32' after fuel depletion. The reservoir container 32' is then transported to a recharging station as discussed above. This configuration reduces the likelihood of corrosion by keeping the metal and electrolyte separated until the fuel is to be utilized in the cells.

In a modification of the foregoing as shown in FIG. 3A, chamber 58 of reservoir chamber 32' can be partitioned into subchambers 58a, 58b and a separator element 60 can be provided between the reservoir container 32' and conduit 50. The anode metal and electrolyte waste products are separated into individual anode metal and electrolyte components by the separator element 60 and then respectively stored in subchambers 58a, 58b. These chambers are analogous to metal and electrolyte supply chambers 56a, 56b described above. In this manner, the metal oxide in chamber 58a is reduced to fresh metal and the electrolyte is reconstituted or replaced in chamber 58b. The operating cycle is thereafter reversed as described above.

Figure 4:
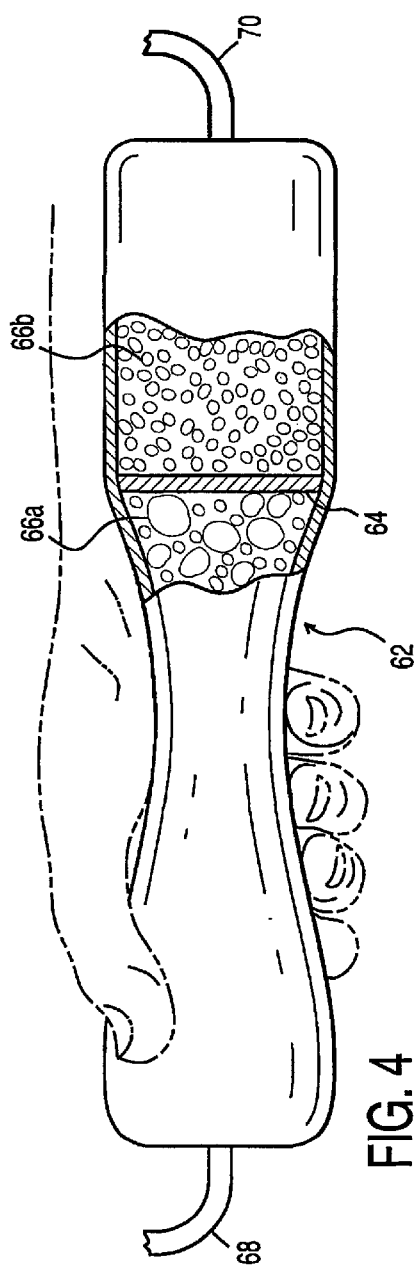
FIG. 4 depicts a reservoir container having flexible walls to enable the anode material to be delivered by compressing the reservoir walls with hand pressure.

Referring now to FIG. 4, there is depicted a reservoir container 62 for use with consumer electronics such as household appliances and the like. The reservoir container 62 comprises a flexible vessel (i.e., plastic) and a fixed partition 64 defining a first chamber 66a and a second chamber 66b for respectively storing anode material and receiving reaction products. In this embodiment pressure applied to the walls of the vessel will force-feed the anode material from the storage chamber 66a and through the conduit 68 to the electrochemical cell(s) (not shown). The reaction products are returned to chamber 66b through a second conduit 70. This "compressible" reservoir container is designed with walls of sufficient thickness and having elastic properties sufficient to permit hand pressure on the walls of the reservoir container to "squeeze out" a volume of fuel from the reservoir container. Although a person's hand is schematically depicted in the drawing, it is anticipated that an external compressing device may be utilized. A preferred expedient will apply radial pressure to the reservoir wall in a "squeezing action" to uniformly dispense the fuel.

Figure 5:
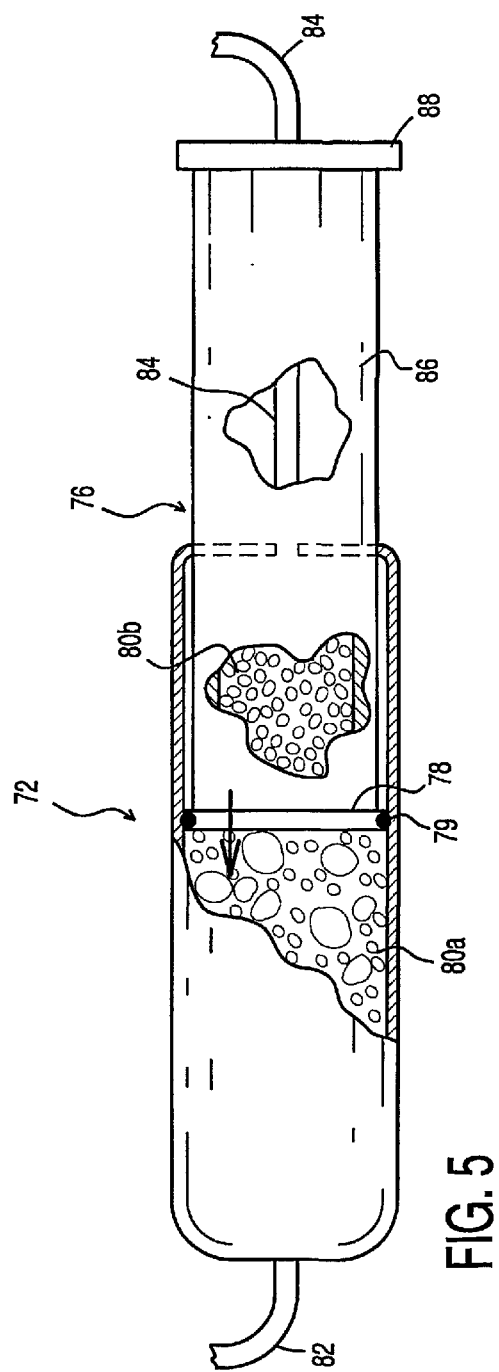
FIG. 5 depicts another embodiment of a reservoir container having a hand driven piston mechanism for dispensing the anode material from the reservoir container.

Referring now to FIG. 5, there is depicted another embodiment of a reservoir container 72 comprising a body 74, and plunger 76. The plunger 76 includes a piston 78 having a sealing assembly 79 and defining chambers 80a, 80b of inversely variable volume to provide the functionality discussed in detail above. A pair of conduits 82, 84 respectively communicate with chambers 80a, 80b. The plunger 76 includes an elongated hollow body 86 and a handle portion 88 to facilitate grasping thereof. The conduit 84 passes through the hollow body 86 and joins chamber 80b as shown. When the plunger 76 is advanced to the left as shown in the drawing, the volume of chamber 80a is reduced while the volume of chamber 80b is concurrently increased thereby forcing fresh fuel out of chamber 80a and permitting reaction products or waste to be received in chamber 80b.

It is to be understood that the foregoing drawings and description of the invention are merely illustrative, and it is anticipated that obvious modifications will be made therefrom by those skilled in the art, without departing from the scope of the invention as defined in the appended claims. Although examples are shown and described for metal air cells and batteries, the single reservoir container of the present invention is well suited to any energy conversion device requiring collection and storage of waste or reaction products.

We claim:

1. A fuel cell system comprising:
    at least one fuel cell element including a cathode;
    a reservoir container including at least two chambers of inversely variable volume for respectively storing a quantity of fuel and receiving a quantity of exhaust, said reservoir container adapted for storing a quantity of electrochemical anode material and a quantity of reaction products, wherein said first chamber comprises a first subchamber for holding fresh anode material and a second subchamber for holding electrolyte for the at least one fuel cell element, and said system further includes means for mixing fresh anode and electrolyte material from the respective first and second subchambers prior to communication to the at least one fuel cell element;
    means for decreasing the volume of said first chamber while concurrently increasing the volume of said second chamber;
    first means for communicating fuel between said at least one fuel cell element and a first of said chambers in said reservoir container; and
    second means for communicating exhaust between said at least one fuel cell element and a second of said chambers in said reservoir container.

2. The fuel cell element of claim 1, further comprising:
    means for regenerating the reaction products into fresh electrochemical anode material in said reservoir container; and
    means for varying the respective volumes of said first and second chambers as fresh anode material is delivered to said fuel cell element and reaction products are delivered to said reservoir.

3. The fuel cell element of claim 1, wherein said first means for communicating and said second means for communicating respectively comprise at least one conduit coupling said at least one fuel cell element to said reservoir, each conduit including electrically insulative valves to selectively enable communication of fresh anode material and reaction products to and from a single fuel cell element in a group of electrically interconnected cell elements.

4. The fuel cell element of claim 1, wherein said second chamber comprises a first subchamber for holding anode reaction material and a second subchamber for holding used electrolyte, and said system further comprises means for separating the anode reaction material from the used electrolyte.

5. The fuel cell element of claim 1 wherein said anode material comprises metal, and said cathode includes an air depolarizer element.

6. The fuel cell element of claim 5 wherein said material derived from said means for mixing fresh anode and electrolyte material from the respective first and second subchambers is a fluid paste comprised of 65% metal granules by weight, and 35% gel electrolyte by weight.

7. The fuel cell element of claim 6, wherein said gel electrolyte comprises up to 5% polyacrylamide, 35% KOH, and water.

8. The fuel cell element of claim 6, wherein said cathode is enclosed in a gelled separator element.

9. The fuel cell element of claim 1, wherein said cathode comprises a metal foam substrate having an active layer, and a hydrophobic microporous gas diffusion layer disposed on at least one surface of the metal foam substrate.

10. For use in an energy conversion system having at least one energy conversion device, a reservoir container for storing a quantity of fuel and a quantity of exhaust, the reservoir container comprising:
    a container body connectable to the at least one energy conversion device and including at least two chambers of inversely variable volume disposed within said container body for respectively storing a quantity of fuel and receiving a quantity of exhaust; and
    means for decreasing the volume of said first chamber while concurrently increasing the volume of said second chamber,
    wherein said reservoir has at least one flexible wall and the system includes means for compressing the flexible wall to force anode material out of said reservoir and into the at least one fuel cell element.

11. In an energy conversion system, a method for supplying fuel to, and collecting exhaust from, an energy conversion device, comprising the steps of:
    connecting to the energy conversion device a reservoir container having at least two chambers for respectively supplying a quantity of fuel to and receiving exhaust from the energy conversion device;
    inversely varying the volume of the first and second of said chambers in said reservoir to supply fuel to said energy conversion device and receive exhaust from said energy conversion device; disconnecting said container from said energy conversion device;
    converting the exhaust into fuel within said container; and
    reconnecting said container to said energy conversion device to supply fresh fuel thereto from the second of said chambers and to receive exhaust in the first of said chambers.

12. In a fuel cell power system, a method for supplying fuel to, and collecting reaction products from, at least one fuel cell element, comprising the steps of:
    connecting to the fuel cell a reservoir container having least two chambers for respectively supplying anode fluid to and receiving reaction products from the fuel cell element;
    inversely varying the volume of the first and second of said chambers in said reservoir to supply anode fluid to said fuel cell and to receive reaction products from said fuel cell element;
    disconnecting said container from said fuel cell;

converting the reaction products in the second of said chambers into fuel; and reconnecting said container to said fuel cell to supply fresh anode fluid thereto from the second of said chambers and to receive reaction products in the first of said chambers.

* * * * *